(12) United States Patent
Nakabayashi

(10) Patent No.: US 8,755,498 B2
(45) Date of Patent: Jun. 17, 2014

(54) COMMUNICATION TERMINAL ADAPTED TO DIRECT DIAL-IN SERVICE AND METHOD OF ESTABLISHING POLARITY

(75) Inventor: Makoto Nakabayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1261 days.

(21) Appl. No.: 12/611,147

(22) Filed: Nov. 3, 2009

(65) Prior Publication Data

US 2010/0118339 A1    May 13, 2010

(30) Foreign Application Priority Data

Nov. 11, 2008 (JP) ................................ 2008-288455

(51) Int. Cl.
*H04M 11/00* (2006.01)
(52) U.S. Cl.
USPC ....................................................... 379/93.14
(58) Field of Classification Search
USPC ............. 379/93.14, 100.01–100.06; 370/236, 370/385, 410, 426, 454, 496, 522; 455/401, 455/515, 528, 68, 69
See application file for complete search history.

(56) References Cited

U.S. PATENT DOCUMENTS

| | | | | |
|---|---|---|---|---|
| 4,190,506 | A * | 2/1980 | Kawasaki et al. | ............. 205/518 |
| 5,612,993 | A * | 3/1997 | Hanaoka et al. | ......... 379/100.03 |
| 6,823,367 | B1 * | 11/2004 | Wakasugi et al. | ............. 709/206 |

FOREIGN PATENT DOCUMENTS

| | | |
|---|---|---|
| JP | 8-204942 | 8/1996 |
| JP | 9-093359 A | 4/1997 |
| JP | 11-308363 | 11/1999 |
| JP | 2001-016358 A | 1/2001 |
| JP | 2006-180402 | 7/2006 |

* cited by examiner

*Primary Examiner* — Maria El-Zoobi
(74) *Attorney, Agent, or Firm* — Renner, Otto, Boisselle & Sklar, LLP

(57) ABSTRACT

A communication terminal supporting direct dial-in service that can accurately establish polarities of station lines and prevent erroneous operation has a direct dial-in connection function of push-button method, and includes: a polarity determining circuit determining polarities of a pair of station lines; a primary acknowledgement signal transmitting circuit responsive to a reception of a call signal after the polarity determining circuit detected reversal of polarities of the station lines, for transmitting a primary acknowledgement signal to a line; an extension designation signal detecting circuit for detecting, after transmission of the primary acknowledgement signal by the primary acknowledgement signal transmitting circuit, reception of an extension designation signal from an exchange, and a polarity establishing circuit responsive to detection by the extension designation signal detecting circuit of the extension designation signal, for establishing polarities of the pair of station lines determined by the polarity determining circuit.

3 Claims, 3 Drawing Sheets

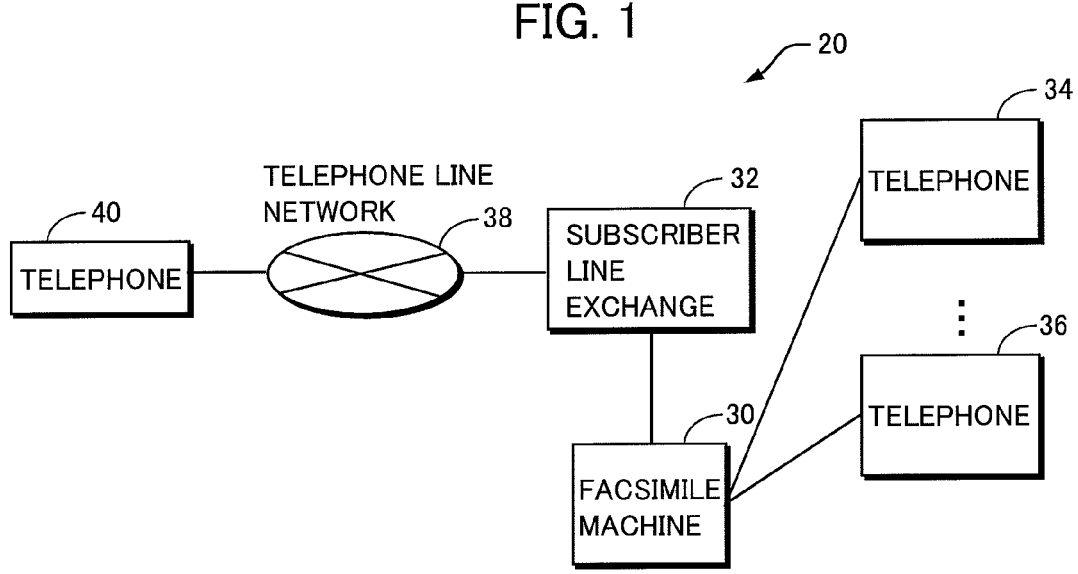
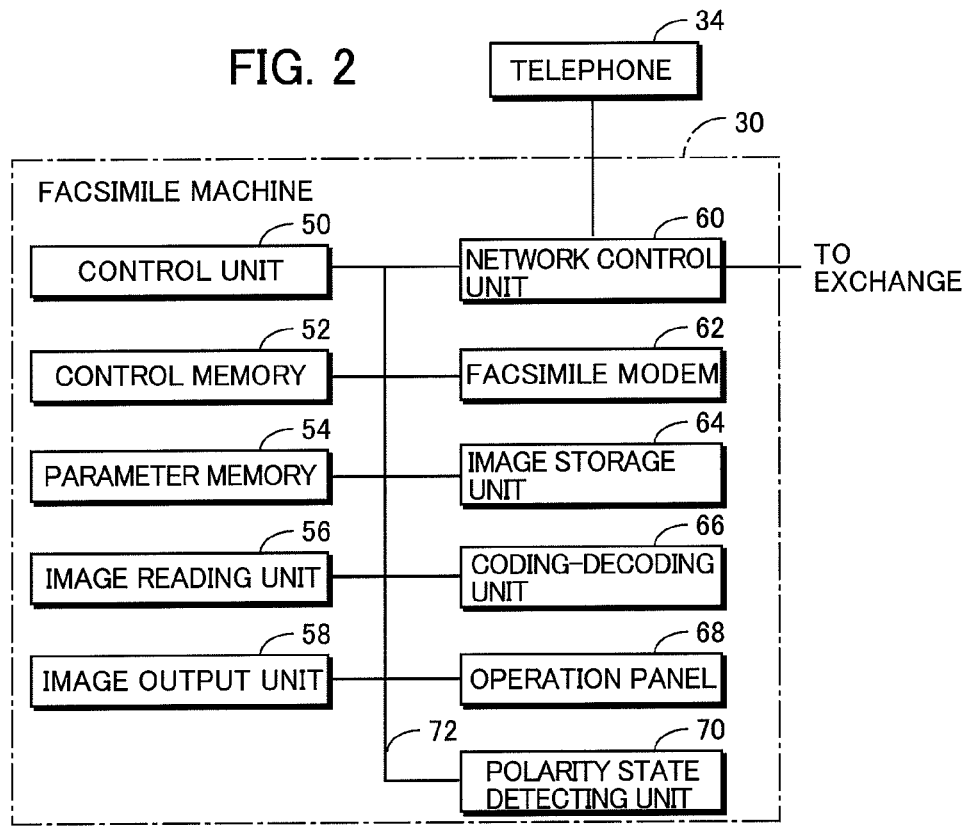

COMMUNICATION TERMINAL ADAPTED TO DIRECT DIAL-IN SERVICE AND METHOD OF ESTABLISHING POLARITY

CROSS-REFERENCE TO RELATED APPLICATION

This nonprovisional application claims priority under 35 U.S.C. §119(a) on Patent Application No. 2008-288455 filed in Japan on Nov. 11, 2008, the entire contents of which are hereby incorporated by reference.

BACKGROUND OF THE INVENTION

1. Field of the Invention

The present invention relates to a communication terminal connected to a telephone line network and, more specifically, to a communication terminal adapted to direct dial-in service.

2. Description of the Background Art

In offices and companies, Direct Dial-In (DDI) service is used by installing a PBX (Private Branch eXchange). DDI service refers to a service in which number information necessary for extension exchange is transmitted from an external communication device to a private branch exchange of a company through a telephone line network, to enable direct connection to the extension. This service enables allocation of a unique number to each telephone connected to the private branch exchange, and a telephone having a desired extension number can directly be called, not through a station line switch board.

A facsimile machine having the DDI connection function described above, which transmits a call tone to a telephone upon detection of a DDI number registered beforehand during an incoming call accepting procedure, has been practically used. The facsimile machine is adapted such that a plurality of telephones are connected to the facsimile machine and different telephone numbers are allocated to the facsimile machine itself and to the plurality of telephones.

FIG. 4 shows an operation sequence of DDI connection in accordance with push-button method between a subscriber line exchange and a DDI-supporting terminal, connected by a pair of station lines L1 and L2. Reference numbers (S1) to (S7) in FIG. 4 are reference numbers allocated to respective operations.

Referring to FIG. 4, when a DDI subscriber is to be called, the subscriber line exchange first reverses polarities of station lines L1 and L2. Within 0.1 second after the polarity reversal, the subscriber line exchange transmits a call signal to the DDI-supporting terminal. Depending on whether a primary acknowledgement signal (formation of a DC loop) is received from the DDI-supporting terminal within 6 seconds from the polarity reversal, the subscriber line exchange operates in different manners. If the primary acknowledgement signal is received within this period, about 0.6 seconds after the reception, the subscriber line exchange transmits an extension designation signal (a number of 1 to 4 digits set in advance by a push-button signal) to the DDI-supporting terminal. If the primary acknowledgement signal does not arrive within 6 seconds, the subscriber line exchange starts an operation of disconnecting from the DDI-supporting terminal.

Depending on whether or not an extension designation reception complete signal (cut-off of DC loop) is received from the DDI-supporting terminal in a period of about 0.3 to 2 seconds after the transmission of extension designation signal is complete, the subscriber line exchange operates in different manners. If the signal does not arrive within this period, the subscriber line exchange starts an operation of disconnecting from the DDI-supporting terminal. If the extension designation reception complete signal is received, after about 0.3 seconds from the reception, the subscriber line exchange enters a standby state, waiting for a secondary acknowledgement signal from the DDI-supporting terminal.

Receiving the secondary acknowledgement signal (formation of DC loop), the subscriber line exchange forms a communication path, by returning the polarities of station lines L1 and L2 to the original polarities.

As described above, conventionally, it has been necessary to measure prescribed time periods after occurrence of some events. Therefore, not only the subscriber line exchange but also the DDI-supporting terminal must have a timer. This results in a complicated structure of the DDI-supporting terminal.

Japanese Patent Laying-Open No. 8-204942 (hereinafter referred to as "'942 application") discloses, in facsimile equipment, a technique of preventing meaningless call operations. Specifically, in the facsimile equipment, if there is an on-hook on the caller side while a connection from the caller side is determined to be a telephone call and the user is being called (while the DC loop is cut off and subscriber line exchange is in the standby state waiting for the secondary acknowledgment signal), the on-hook operation is detected. In response to the detected on-hook operation, the facsimile equipment stops the calling operation.

Recently, as one of pre-communication notice services, a modem DDI service has been provided. According to this service, it is possible for the subscriber line exchange to detect the DDI number before receiving a call signal. By the time the call signal is received, the DDI number has already been known to the subscriber exchange and, therefore, it is possible to call a designated telephone or the like directly.

Japanese Patent Laying-Open No. 11-308363 (hereinafter referred to as "'363 application") discloses a technique allowing execution of a desired process without charging the call fee on the call source. Specifically, utilizing the modem DDI service, the subscriber line exchange executes a process in accordance with the DDI number before line connection. As a result, the desired process can be executed without causing any call charge on the calling source.

Referring to FIG. 4, in the operation sequence of the conventional DDI service, when polarities of station lines L1 and L2 are reversed by the subscriber line exchange (S1), the DDI-supporting terminal receives the subsequently transmitted call signal (S2). In response, the DDI-supporting terminal issues the primary acknowledgement signal (forms a DC loop) (S3) and, after a prescribed time period (ta), it detects polarities of station lines and establishes the polarities. Immediately after the formation of DC loop, however, the line voltages of station lines L1 and L2 are unstable. Therefore, conventionally, sometimes the DDI-supporting terminal establishes station lines L1 and L2 in polarities different from the specification. Since the polarities of station lines are not correctly established, there has been a problem that a device on one side of communication erroneously recognizes that the other side of communication has cut off connection during communication after the second acknowledgement and erroneously disconnects the station line of itself.

The techniques disclosed in '942 and '363 applications are on the premise that the operation sequence of DDI connection is correctly performed. Therefore, the above-described problem cannot be solved by these techniques.

SUMMARY OF THE INVENTION

Therefore, a communication terminal supporting the DDI service that can correctly establish polarities of station lines and prevent erroneous operation has been desired.

According to a first aspect, the present invention provides a communication terminal with a direct dial-in function of push button method, including: a polarity determining circuit connected to a pair of station lines; a primary acknowledgement signal transmitting circuit connected to the pair of station lines and to the polarity determining circuit; an extension designation signal detecting circuit connected to the pair of station lines and to the primary acknowledgement signal transmitting circuit; and a polarity establishing circuit connected to the extension designation signal detecting circuit, responsive to reception by the extension designation signal detecting circuit of a part of extension designation signal after detection by the polarity determining circuit that polarities of the pair of station lines are reversed, for establishing the polarities of the pair of station lines determined by the polarity determining circuit.

The polarity determining circuit determines the polarities of a pair of station lines. The primary acknowledgment signal transmitting circuit transmits the primary acknowledgement signal to the line. The extension designation signal detecting circuit detects reception of a part of the extension designation signal from the exchange. In response to the extension designation signal detecting circuit receiving a part of the extension designation signal, the polarity establishing circuit establishes the polarities of the pair of station lines determined by the polarity determining circuit.

In the communication terminal, when a part of the extension designation signal is received from the exchange, the polarities of station lines are established. The extension designation signal is transmitted prescribed time period after the formation of DC loop with the exchange and, therefore, the station line polarity can be established with the line voltages of station lines being stable. As a result, a DDI-supporting communication terminal that can correctly establish polarities of station lines and prevent erroneous operation can be provided. Different from the conventional art, timers and the like for enabling stable establishment of station lines are unnecessary.

According to a second aspect, the present invention provides a communication terminal with a direct dial-in function of push button method, including: a polarity determining circuit connected to a pair of station lines, for determining polarities of the pair of station lines; a primary acknowledgement signal transmitting circuit connected to the pair of station lines and to the polarity determining circuit, responsive to reception of a call signal after the polarity determining circuit detected reversal of polarities of the pair of station lines, for transmitting a primary acknowledgement signal to a line; an extension designation signal detecting circuit for detecting a part of an extension designation signal from an exchange, after transmission of the primary acknowledgement signal by the primary acknowledgement signal transmitting circuit; and a polarity establishing circuit, responsive to detection by the extension designation signal detecting circuit of a part of the extension designation signal, for establishing polarities of the station lines determined by the polarity determining circuit.

The polarity determining circuit determines the polarities of a pair of station lines. The primary acknowledgment signal transmitting circuit transmits the primary acknowledgement signal to the line, in response to reception of a call signal after the polarity determining circuit detects reversal of station line polarities. After the transmission of primary acknowledgement signal by the primary acknowledgement signal transmitting circuit, extension designation signal detecting circuit detects reception of a part of the extension designation signal from the exchange. In response to the extension designation signal detecting circuit receiving a part of the extension designation signal, the polarity establishing circuit establishes the polarities of the pair of station lines determined by the polarity determining circuit.

In the communication terminal, for the DDI connection of push-button method, when a part of the extension designation signal transmitted from the exchange is received from the exchange, the polarities of the pair of station lines are established. The extension designation signal is transmitted prescribed time period after the formation of DC loop with the exchange and, therefore, the station line polarity can be established with the line voltages of the pair of station lines being stable. As a result, a DDI-supporting communication terminal that can correctly establish polarities of station lines and prevent erroneous operation can be provided.

Preferably, the extension designation signal detecting circuit includes a circuit for detecting reception of a signal indicating a prescribed number of digits, preferably, the first digit, from the start of the extension designation signal. The polarity establishing circuit includes a circuit, responsive to detection by the detecting circuit of reception of the signal indicating the prescribed number of digits, for establishing polarities of the station lines determined by the polarity determining circuit.

In the DDI service in accordance with push-button method, how many digits from one to four is to be used for the extension designation number is set in advance by the user. The polarity states of the pair of station lines are established when a prescribed number of digits from the start of extension designation signal, preferably the first digit, is received, by the communication terminal and, therefore, it becomes possible to establish the station line polarity without the necessity of considering the number of digits of the received extension designation signal.

According to a third aspect, the present invention provides, in a communication terminal connected to an exchange through a pair of station lines and having a direct dial-in connection function of push-button method, a polarity establishing method for establishing polarities of the station lines, including the steps of: detecting reversal of polarities of the pair of station lines; after the detecting step, transmitting a primary acknowledgement signal through the pair of station lines; after the transmitting step, receiving a signal designating a part of an extension number through the pair of station lines; after completion of the receiving step, establishing polarities of the pair of station lines; and after completion of the establishing step, receiving a signal designating any remaining digit of the extension number.

The step of receiving a signal designating a part of an extension number includes the step of receiving, after the transmitting step, a signal indicating up to a prescribed number of digits from the start of the extension number, through the pair of station lines.

As described above, by the communication terminal and by the polarity establishing method of the present invention, it is possible to establish station line polarity with the line voltages of the pair of station lines being in a stable state. Therefore, station line polarity can correctly be recognized, and erroneous operation can be prevented. As a result, a DDI service supporting communication terminal and the polarity establishing method that can correctly establish the station line polarity and prevent erroneous operation can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a configuration of a data communication system 20 including a facsimile machine 30 having the DDI connection function in accordance with an embodiment.

FIG. 2 is a block diagram showing a configuration of facsimile machine 30.

DESCRIPTION OF THE PREFERRED EMBODIMENTS

Figure 3:
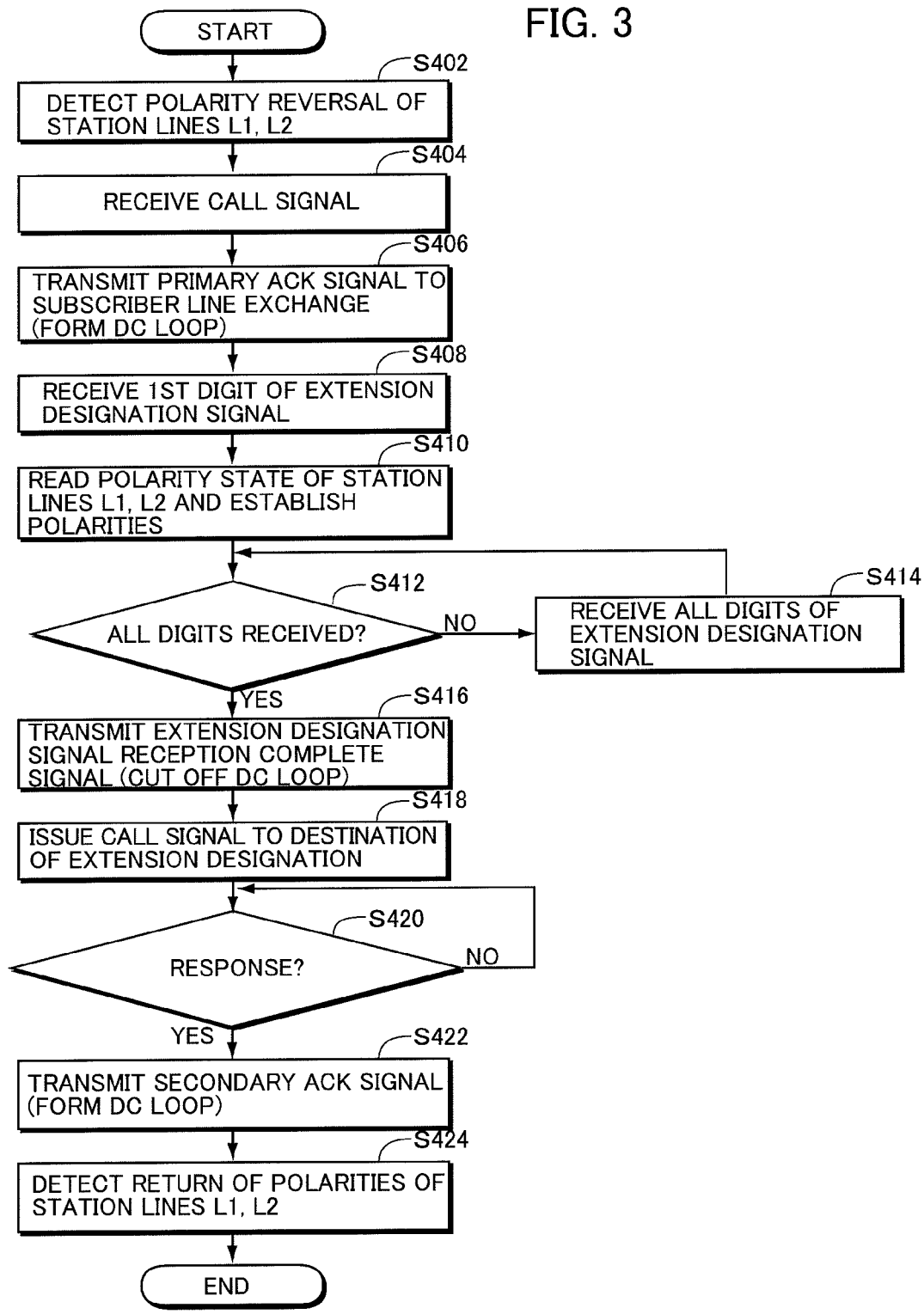
FIG. 3 shows, in the form of a flowchart, a control structure of a program realizing a process of receiving a DDI call signal from a subscriber line exchange 32 and establishing communication state with a designated telephone 34, executed by a control unit 50 of facsimile machine 30.

In the following description and in the drawings, the same components are denoted by the same reference characters and same names. Their functions are also the same. Therefore, detailed description thereof will not be repeated.

-Configuration-

Referring to FIG. 1, a data communication system 20 includes a facsimile machine 30 having the DDI connection function in accordance with an embodiment of the present invention. Facsimile machine 30 is connected to a subscriber line exchange 32 and to telephones 34 and 36 that are DDI-connected to facsimile machine 30. Subscriber line exchange 32 is connected to a telephone line network 38. Telephone line network 38 is further connected to an unspecified number of telephones 40 as counter parts of communication.

Referring to FIG. 2, facsimile machine 30 includes: a control unit 50 implemented by a CPU (Central Processing Unit) for overall control of facsimile machine 30, a bus 72 connected to control unit 50, and a control memory 52 for storing a control program, formed of a non-volatile memory or the like, a parameter memory 54 for recording various pieces of information inherent to facsimile machine 30 such as registration information of extension numbers for calling telephones 34 and 36 connected to facsimile machine 30, an image reading unit 56 for reading a document image, an image output unit 58 for outputting the image data on a sheet of recording paper, an operation panel 68 for receiving an input instruction from a user, a coding-decoding unit 66 for coding read image data and decoding received coded data to original image data, and an image storage unit 64 for storing the coded image data as well as the image data read by image reading unit 56, all connected to bus 72.

Facsimile machine 30 further includes a network control unit 60 connected to a telephone line network for controlling a line, a facsimile modem 62 connected to the telephone network for performing facsimile transmission, and a polarity state detecting unit 70 for determining a polarity state of a telephone line connected through network control unit 60.

Control memory 52, parameter memory 54, image reading unit 56, image output unit 58, operation panel 68, coding-decoding unit 66, image storage unit 64, network control unit 60, facsimile modem 62 and polarity state detecting unit 70 are connected to bus 72 and control unit 50 is in charge of overall control.

Subscriber line exchange 32 and facsimile machine 30 are connected through network control unit 60 by a telephone line formed of a pair of station lines (L1, L2). Polarity state detecting unit 70 determines polarity states of station lines L1 and L2.

The program of which control structure is shown in FIG. 3 is executed when polarity reversal of telephone line is detected from subscriber line exchange 32.

Figure 4:
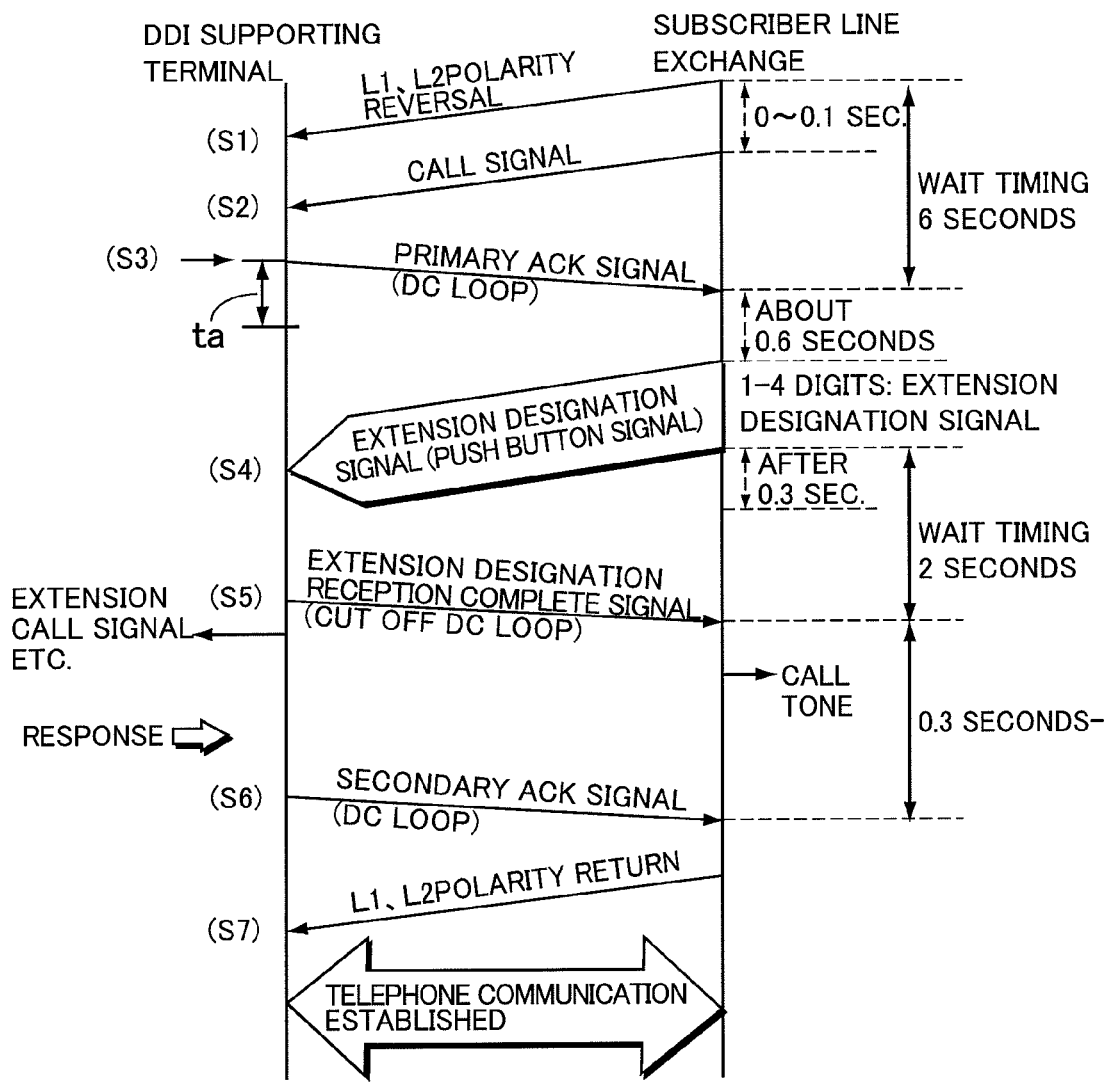
FIG. 4 shows an operation sequence of DDI connection in accordance with push button method, between a subscriber line exchange and a DDI-supporting terminal.

Referring to FIG. 3, the program includes: a step S402 (S1 of FIG. 4) of detecting polarity reversal of station lines L1 and L2 from subscriber line exchange 32; a step 404 (S2 of FIG. 4), following step S402, of receiving a call signal from subscriber line exchange 32; a step S406 (S3 of FIG. 4), following step S404, of transmitting the primary acknowledgement signal to subscriber line exchange 32 and forming a DC loop; a step S408, following step S406, of receiving the first digit of the extension designation signal (1 to 4 digits) transmitted from subscriber line exchange 32; a step S410, following step S408, of polarity state detecting unit 70 reading the polarity states of station lines L1 and L2, and establishing polarities of station lines L1 and L2; a step S412, following step S410, of determining whether all digits of extension designation signal transmitted from subscriber line exchange 32 have been received, and branching control flow depending on the result of determination; and a step S414 (S4 of FIG. 4), executed if it is determined at step S412 that not all the digits of extension designation signal have been received (NO), of receiving remaining digits of the extension designation signal. After the execution of step S414, the control proceeds to step S412.

For the extension designation signal transmitted from subscriber line exchange 32, an arbitrary number of digits from one to four is selected, in consideration of, for example, the number of extension lines. The number of digits is set in advance, in accordance with the user's preference.

The program further includes: a step S416 (S5 of FIG. 4), executed if it is determined at step S412 that all digits of extension designation signal have been received (YES), of transmitting the extension designation signal reception complete signal to subscriber line exchange 32 and cutting off the DC loop; a step S418, following step S416, of sending a call signal to telephone 34 having the number designated by the extension designation signal; a step S420, following step S418, of determining whether there is any response from telephone 34 to which the call signal has been sent, and branching control flow depending on the result of determination; a step S422 (S6 of FIG. 4), executed if it is determined at step S420 that there has been a response (YES), of transmitting the secondary acknowledgement signal to subscriber line exchange 32 and forming a DC loop; and a step S424 (S7 of FIG. 4), following step S422, of establishing communication state between telephone 34 and subscriber line exchange 32 and detecting return of polarities of station lines L1 and L2 from subscriber line exchange 32. If it is determined at step S420 that there is no response (NO), the control returns to step S420, and waits for a response.

-Operation-

When a DDI service in accordance with the push button method is received by a subscriber line connected to facsimile machine 30, facsimile machine 30 with the DDI connection function in accordance with the present embodiment operates in the following manner, to realize the communication state of the line.

When polarities of station lines L1 and L2 are reversed and a call signal is received (steps S402, 404), facsimile machine 30 transmits the primary acknowledgement signal to subscriber line exchange 32 and forms a DC loop (step S406). In response to reception of the primary acknowledgement signal from facsimile machine 30, subscriber line exchange 32 issues, about 0.6 seconds after the signal reception, the extension designation signal. Facsimile machine 30 reads polarity states of station lines L1 and L2 when the first digit of the issued extension designation signal is received, and establishes the polarities of station lines (steps S408, 410).

Thereafter, facsimile machine 30 receives all digits of the transmitted extension designation signal (steps S412, 414), transmits the extension designation reception complete signal to subscriber line exchange 32, and cuts off the DC loop (step S416). Thereafter, facsimile machine 30 sends a call signal to the destination of extension designation signal and, if there is any response to the call signal, transmits the secondary acknowledgement signal to subscriber line exchange 32 and forms a DC loop (steps S418, 420, 422). Thereafter, polarities of station lines L1 and L2 are returned, and the line communication state is realized (step S424).

As described above, facsimile machine 30 is adapted to detect the polarity states of station lines L1 and L2 when the first digit of extension designation signal transmitted from subscriber line exchange 32 is received. Since a prescribed time period is necessary from the transmission of the primary acknowledgement signal until the reception of extension designation signal, it follows that the polarities of station lines can be detected in a stable state, not influenced by the fluctuation in line voltages that occur immediately after the formation of DC loop. Therefore, it is possible for facsimile machine 30 to establish the line polarity as defined in the specification. As a result, a communication terminal supporting the DDI service that can correctly establish the line polarities and prevent erroneous operation can be realized.

In the DDI service in accordance with push-button method, how many digits from one to four is to be used as the extension designation signal is set in advance by the user. Therefore, the number of digits set for the extension designation signal differs user by user. Since the communication terminal establishes the polarity states of station lines L1 and L2 when the first digit of extension designation signal is received, the station line polarity can be established without the necessity of considering the number of digits of extension designation signal to be received.

Since determination and establishment of station line polarities are determined to be done when the first digit of extension designation signal is received, the timer for measuring the prescribed time period (ta) from the transmission of primary acknowledgement signal, which has been necessary in the prior art, can be eliminated. Therefore, device structure can be simplified.

Though facsimile machine 30 having the DDI connection function has been described, the present invention is applicable to any device other than the facsimile machine, such as a PBX, provided that it has the DDI connection function.

Though the determination and establishment of station line polarities are done when the first digit of extension designation signal is received in the embodiment described above, the present invention is not limited to such an embodiment. The determination and establishment of station line polarities may be done when any number of digits up to the full number of digits of the extension designation signal is received, for example, when the second or third digit, or all digits of extension designation signal are received.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A communication terminal with a direct dial-in function in a push button communication system, comprising:
    a polarity determining circuit connected to a pair of station lines;
    a primary acknowledgement signal transmitting circuit connected to said pair of station lines and to said polarity determining circuit;
    an extension designation signal detecting circuit connected to said pair of station lines and to said primary acknowledgement signal transmitting circuit; and
    a polarity establishing circuit connected to said extension designation signal detecting circuit, responsive to reception by said extension designation signal detecting circuit of a first digit at the start of an extension designation signal after detection by said polarity determining circuit that polarities of said pair of station lines are reversed, for establishing the polarities of said pair of station lines determined by said polarity determining circuit; wherein
    said extension designation signal detecting circuit includes a prescribed digit reception detecting circuit responsive to reception of the first digit at the start of said extension designation signal to output a detection signal; and
    said polarity establishing circuit includes a circuit responsive to said detection signal for establishing polarities of said pair of station lines determined by said polarity determining circuit.

2. A communication terminal with a direct dial-in function in a push button communication system, comprising:
    polarity determining means connected to a pair of station lines, for determining polarities of said pair of station lines;
    primary acknowledgement signal transmitting means connected to said pair of station lines and to said polarity determining means, responsive to reception of a call signal after said polarity determining means detected reversal of polarities of said pair of station lines, for transmitting a primary acknowledgement signal to a line;
    extension designation signal detecting means for detecting a first digit at the start of an extension designation signal from an exchange, after transmission of said primary acknowledgement signal by said primary acknowledgement signal transmitting means; and
    polarity establishing means, responsive to detection by said extension designation signal detecting means of the first digit at the start of said extension designation signal, for establishing polarities of said station lines determined by said polarity determining means wherein;
    said extension designation signal detecting means includes means for detecting reception of a signal indicating the first digit at the start of said extension designation signal; and
    said polarity establishing means includes means, responsive to detection by said detecting means of reception of the signal indicating the first digit, for establishing polarities of said station lines determined by said polarity determining means.

3. In a communication terminal connected to an exchange through a pair of station lines and having a direct dial-in connection function in a push-button communication system, a polarity establishing method for establishing polarities of the station lines, comprising the steps of:
    detecting reversal of polarities of said pair of station lines;
    after said detecting step, transmitting a primary acknowledgement signal through said pair of station lines;
    after said transmitting step, receiving a signal designating the first digit at the start of an extension number through said pair of station lines;

after completion of said receiving step, establishing polarities of said pair of station lines; and after completion of said establishing step, receiving a signal designating a remaining digit of said extension number; wherein said step of receiving a signal designating the first digit at the start of an extension number includes the step of receiving, after said transmitting step, a signal indicating the first digit at the start of said extension number, through said pair of station lines.

* * * * *